(12) United States Patent
Lee et al.

(10) Patent No.: US 9,857,206 B1
(45) Date of Patent: Jan. 2, 2018

(54) WATERPROOFING DEVICE AND DISTANCE SENSOR USING THE SAME

(71) Applicant: HON HAI PRECISION INDUSTRY CO., LTD., New Taipei (TW)

(72) Inventors: Kai-Fan Lee, New Taipei (TW); Yu-Wen Chen, New Taipei (TW); Ya-Kuan Chuang, New Taipei (TW); You-Yun Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/231,729

(22) Filed: Aug. 8, 2016

(30) Foreign Application Priority Data

Jun. 29, 2016 (CN) .......................... 2016 1 0492374

(51) Int. Cl.
*G01D 11/24* (2006.01)

(52) U.S. Cl.
CPC .................. *G01D 11/245* (2013.01)

(58) Field of Classification Search
CPC .............................. G01D 11/24; G01D 11/245
USPC ........................................................... 73/431
See application file for complete search history.

(56) References Cited

U.S. PATENT DOCUMENTS

| | | | | |
|---|---|---|---|---|
| 6,040,897 A | * | 3/2000 | Clifford | G01F 23/2928 356/4.01 |
| 2003/0221250 A1 | * | 12/2003 | Gibson | E04H 4/12 4/508 |
| 2008/0171927 A1 | * | 7/2008 | Yang | A61B 5/14552 600/340 |
| 2014/0033984 A1 | * | 2/2014 | Li | H01F 38/14 119/247 |

* cited by examiner

*Primary Examiner* — Lisa Caputo
*Assistant Examiner* — Jamel Williams
(74) *Attorney, Agent, or Firm* — ScienBiziP, P.C.

(57) ABSTRACT

A waterproofing device installed on a distance sensor enables outdoor operations of a robot or operations in wet or adverse environments. The distance sensor includes a signal transmitter and a signal receiver. The waterproofing device includes a protection member installed on the distance sensor, and covers installed on the protection member. The protection member includes sleeves aligning with the signal transmitter and the signal receiver. The cover includes a sieve plate covering one end of the sleeve to prevent liquid from entering into the sleeve and a drain plug to discharge any liquid incidentally entering.

20 Claims, 4 Drawing Sheets

WATERPROOFING DEVICE AND DISTANCE SENSOR USING THE SAME

CROSS-REFERENCE TO RELATED APPLICATIONS

This application claims priority to Chinese Patent Application No. 201610492374.9 filed on Jun. 29, 2016 the contents of which are incorporated by reference herein.

FIELD

The subject matter herein generally relates to waterproofing devices, and more particularly to a water-excluding device for a distance sensor.

BACKGROUND

Mobile robots can be equipped with a distance sensor. Relative positions of the robot and the surrounding environment can be calculated out according to the time difference between a signal transmitted and received, providing the basis of a determination of robot movement. However, when the distance sensor is exposed to water of other liquid false readings and interference signals may happen.

BRIEF DESCRIPTION OF THE DRAWINGS

Implementations of the present technology will now be described, by way of example only, with reference to the attached figures.

DETAILED DESCRIPTION

Figure 1:
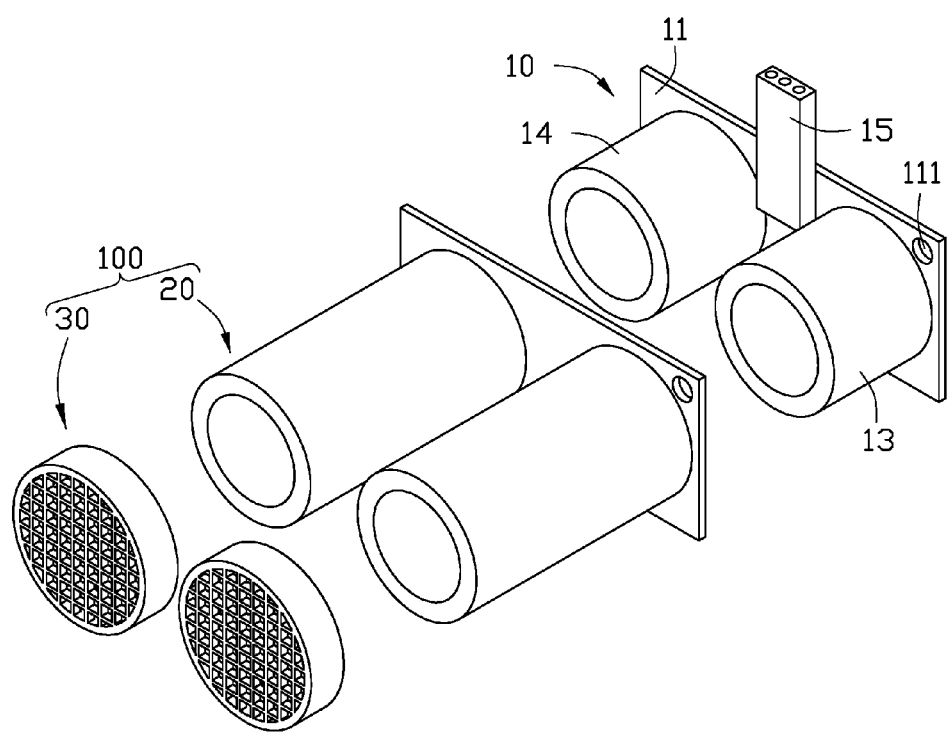
FIG. 1 is an exploded, isometric view of an embodiment of a waterproofing device and a distance sensor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates one embodiment of a waterproofing device 100 installed in a distance sensor 10. The waterproofing device 100 is configured to prevent liquid entering into the distance sensor 10. The waterproofing device 100 includes a protection member 20 and a cover 30 installed on an end of the protection member 20. In at least one embodiment, the distance sensor 10 may be in a mobile robot.

The distance sensor 10 includes a circuit board 11, a chip (not shown) installed on the circuit board 11, a signal transmitter 13, a signal receiver 14, and a connector 15. At least one securing hole 111 is defined on the circuit board 11. The waterproofing is configured to be secured in the securing hole 111. The chip is configured to control the signal transmitter 13 to transmit signal, and the signal receiver 14 is configured to receive the reflected signal. The chip calculates the time difference and distance accordingly and transfers the results to the other electronic devices (not shown) via the connector 15. The signal transmitter 13 and the signal receiver 14 are installed on the same side of the circuit board 11 and a protection member 20 and a cover 30 for each of the transmitter 13 and the receiver 14 are installed as a single unit on the transmitter 13 and the receiver 14. In at least one embodiment, the distance sensor 10 can be an ultrasonic distance sensor or a laser distance sensor.

Figure 2:
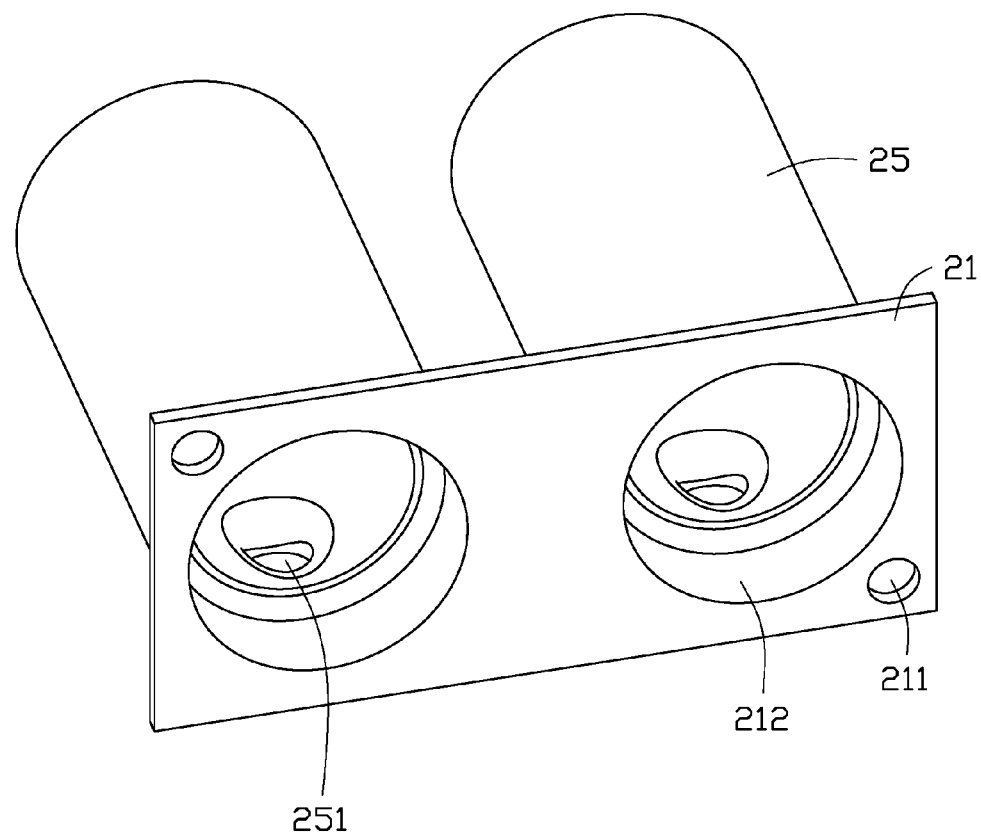
FIG. 2 is an exploded, isometric view of the waterproofing device of FIG. 1.

FIGS. 1 and 2 illustrate that the waterproofing device 100 includes a securing plate 21 and two sleeves 25 installed on the securing plate 21. One or more securing members (not shown) pass through the limiting holes 211 and are inserted into the securing holes 111 of the circuit board 11 to secure the protection member 20 on the distance sensor 10. The securing plate 21 further defines two openings 212. The signal of the signal transmitter 13 can pass through one of the openings 212 and can return back to the signal receiver 14 via the other opening 212.

The sleeve 25 is substantially cylindrical and a cross-section of the sleeve 25 is substantially circular. The inside of the sleeve 25 is hollow to define a passageway, the signal can pass through the passageway. One end of the sleeve 25 is secured on one side of the securing plate 21. The openings 212 communicate with the passageway. In at least one embodiment, the sleeve can be secured on the securing plate 21 by soldering or gluing. The sleeve 25 defines a drain hole 251. Any liquid within the sleeve 25 can be discharged by the drain hole 251.

Figure 3:
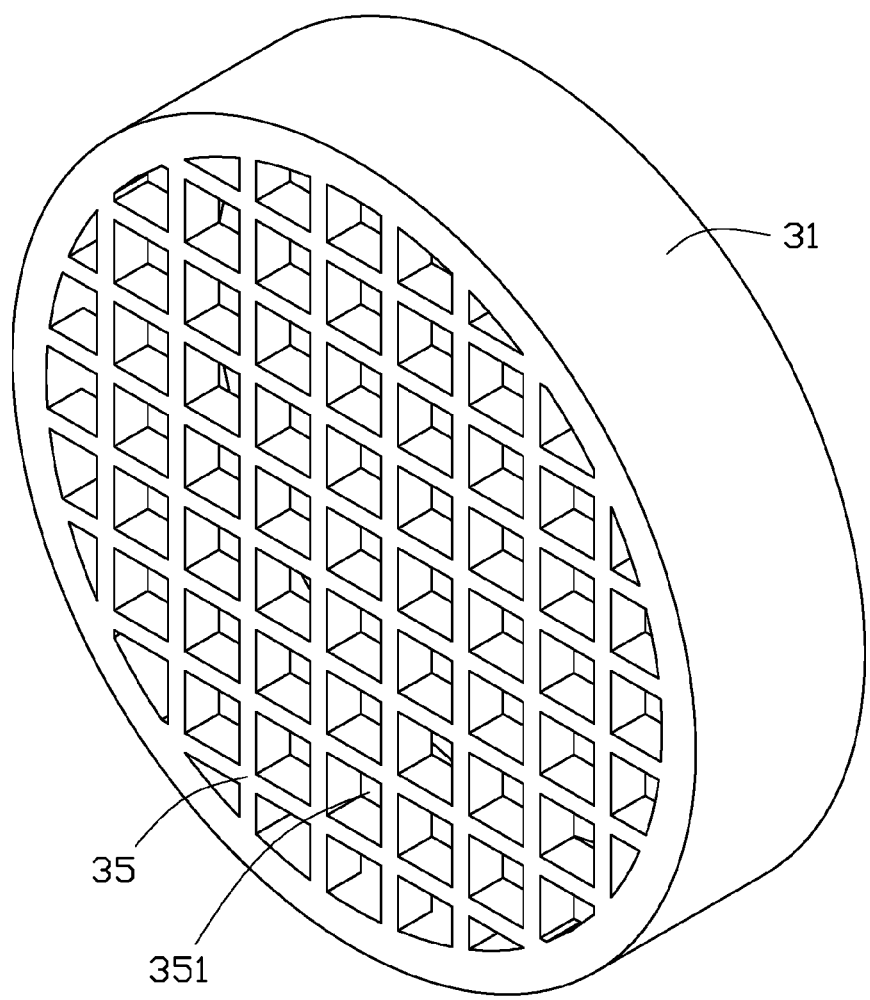
FIG. 3 is an assembled, isometric view of the waterproofing device of FIG. 1.

FIGS. 1 and 3 illustrate that each cover 30 includes a securing ring 31 and a sieve plate 35 secured in the securing ring 31. The cross-section of the securing ring 31 is a substantially circular. The diameter of the inner wall of the securing ring 31 is substantially equal to the diameter of the outer wall of the sleeve 25. The securing ring 31 is configured to be installed on the other end of the sleeve 25 to secure the cover 30 on the protection member 20. The sieve plate 35 covers one end of the passageway. The sieve plate 35 defines a plurality of through holes 351. The size of each through hole 351 can prevent the passage of any liquid but does not affect the passage of the signal of the signal transmitter 13.

Figure 4:
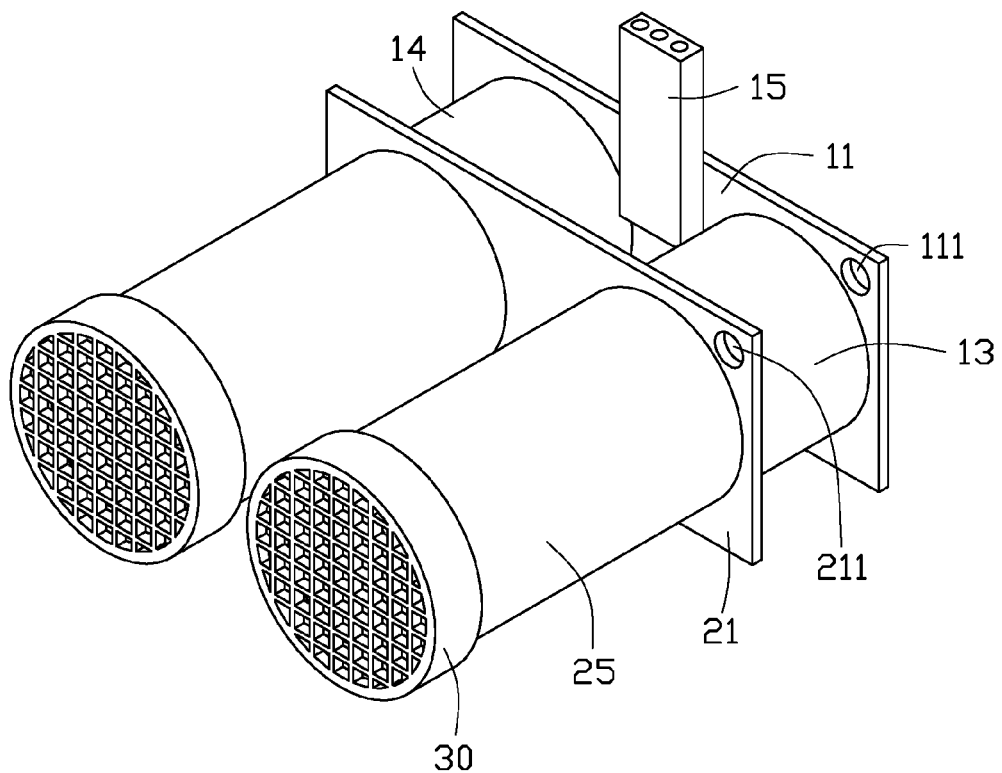
FIG. 4 is an assembled, isometric view of the waterproofing device and the distance sensor of FIG. 1.

FIGS. 3 and 4 illustrate assembly. The chip, the signal transmitter 13, the signal receiver 14, and the connector 15 are installed on the circuit board 11. One end of each sleeve 25 is secured on one side of the securing plate 21. The passageway of the sleeve 25 communicates with the opening 212 of the securing plate 21. The drain hole 251 is vertically at the bottom to conveniently discharge liquid. The cover 30 is installed on the other end of each sleeve 25. The sieve plate 35 covers one end of the passageway.

The securing plate 21 is located on one side of the distance sensor 10. The limiting holes 211 are aligned with the securing holes 111 of the circuit board 11. The openings 212 align with the signal transmitter 13 and the signal receiver 14. The securing members pass through the limiting holes 211 into the securing holes 111 to secure the waterproofing device 100 on the distance sensor 10.

When the distance sensor 10 is operated out of doors or application environments subject to agitated liquids, the sieve plate 35 resists the ingress of liquid. Any small amount of liquid entering through the sieve plate 35 into the protection member 20 will be discharged through the drain hole 251 so as to provide an effective waterproofing effect for the distance sensor 10.

The embodiments shown and described above are only examples. Many details are often found in the art such as the other features of a waterproofing device and distance sensor using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A waterproofing device configured to be installed in a distance sensor comprising a signal transmitter and a signal receiver, comprising:
    a protection member installed on the distance sensor and comprising two sleeves; and
    two covers installed on the protection member and each comprising a sieve plate;
    wherein the two sleeves are respectively aligned with the signal transmitter and the signal receiver, and the sieve plate is covered on one end of each sleeve to prevent liquid from entering into the sleeve.

2. The waterproofing device of claim 1, wherein each sleeve defines a drain hole, the liquid within the sleeve is configured to be discharged by the drain hole.

3. The waterproofing device of claim 1, wherein the distance sensor comprises circuit board, the protection member comprises a securing plate, and the circuit board is secured with the securing plate.

4. The waterproofing device of claim 3, wherein circuit board defines a plurality of securing holes, the securing plate defines a plurality of limiting holes, a plurality of securing members pass through the limiting holes to insert into the securing holes to secure the protection member on the distance sensor.

5. The waterproofing device of claim 4, wherein the securing plate defines two openings, the two openings are respectively aligned with the signal transmitter and the signal receiver.

6. The waterproofing device of claim 3, wherein the distance sensor further comprises a chip installed on the circuit board, the chip is configured to control the signal transmitter and the signal receiver.

7. The waterproofing device of claim 6, wherein the distance sensor is an ultrasonic distance sensor.

8. The waterproofing device of claim 1, wherein the inner of the sleeve is hollow and defines a passageway, which is configured for the signal passing through.

9. The waterproofing device of claim 1, wherein the cover further comprises a securing ring, and the sieve plate is received in the securing ring.

10. The waterproofing device of claim 9, wherein the sleeve is cylindrical and a cross-section of the sleeve is circular, a cross-section of the securing ring is circular, and the diameter of the inner wall of the securing ring is equal to the diameter if the outer wall of the sleeve.

11. A distance sensor comprising:
    a signal transmitter;
    a signal receiver; and
    a waterproofing device configured to be installed in a distance sensor, comprising:
        a protection member installed on the distance sensor and comprising two sleeves; and
        two covers installed on the protection member and each comprising a sieve plate;
    wherein the two sleeves are respectively aligned with the signal transmitter and the signal receiver, and the sieve plate is covered on one end of each sleeve to prevent liquid from entering into the sleeve.

12. The distance sensor of claim 11, wherein the each sleeve defines a drain hole, the liquid within the sleeve is configured to be discharged by the drain hole.

13. The distance sensor of claim 11, wherein distance sensor comprises circuit board, the protection member comprises a securing plate, and the circuit board is secured with the securing plate.

14. The distance sensor of claim 13, wherein circuit board defines a plurality of securing holes, the securing plate defines a plurality of limiting holes, a plurality of securing members pass through the limiting holes to insert into the securing holes to secure the protection member on the distance sensor.

15. The distance sensor of claim 14, wherein the securing plate defines two openings, the two openings are respectively aligned with the signal transmitter and the signal receiver.

16. The distance sensor of claim 13, wherein the distance sensor further comprises a chip installed on the circuit board, the chip is configured to control the signal transmitter and the signal receiver.

17. The distance sensor of claim 16, wherein the distance sensor is an ultrasonic distance sensor.

18. The distance sensor of claim 11, wherein the inner of the sleeve is hollow and defines a passageway, which is configured for the signal passing through.

19. The distance sensor of claim 11, wherein the cover further comprises a securing ring, and the sieve plate is received in the securing ring.

20. The distance sensor of claim 19, wherein the sleeve is cylindrical and a cross-section of the sleeve is circular, a cross-section of the securing ring is circular, and the diameter of the inner wall of the securing ring is equal to the diameter if the outer wall of the sleeve.

* * * * *